June 11, 1935.    G. F. CAHILL    2,004,888
SPORTS ARENA AND THE ACCESSORY THERETO
Filed Sept. 6, 1934    7 Sheets-Sheet 1
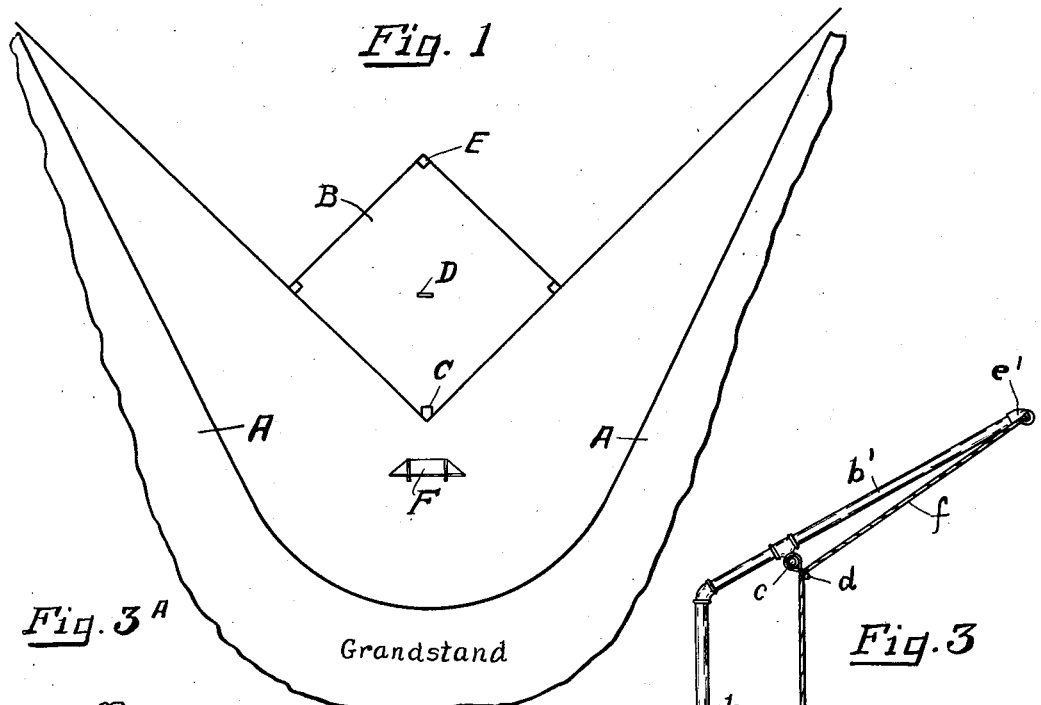
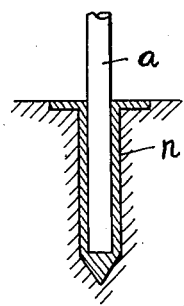
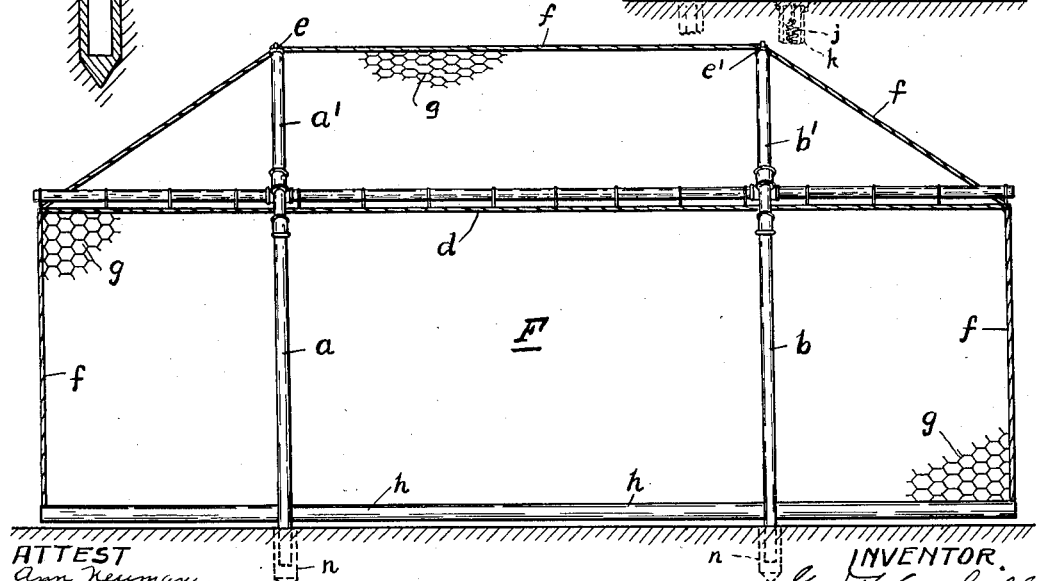
ATTEST    INVENTOR.

June 11, 1935. G. F. CAHILL 2,004,888
SPORTS ARENA AND THE ACCESSORY THERETO
Filed Sept. 6, 1934 7 Sheets-Sheet 2
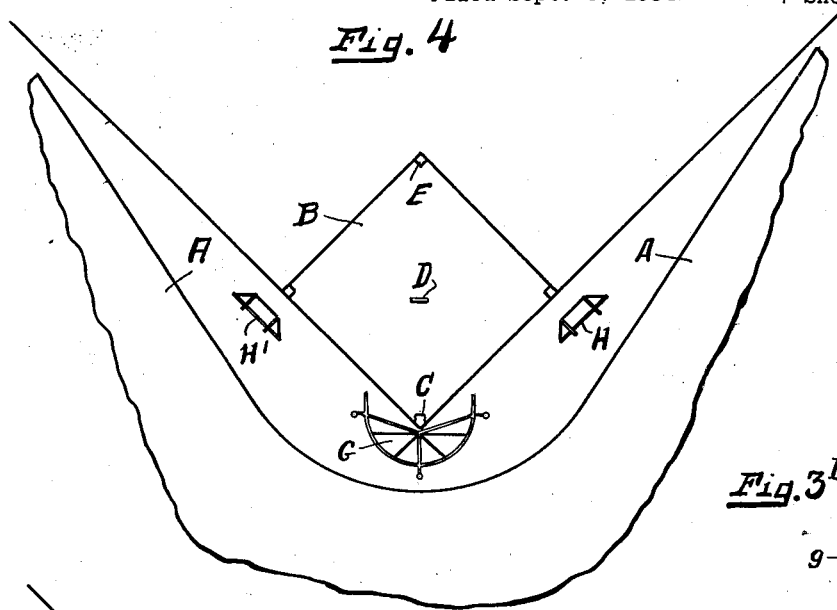
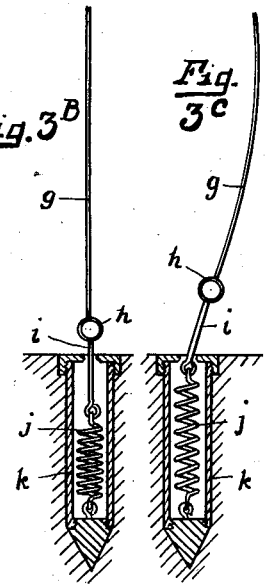
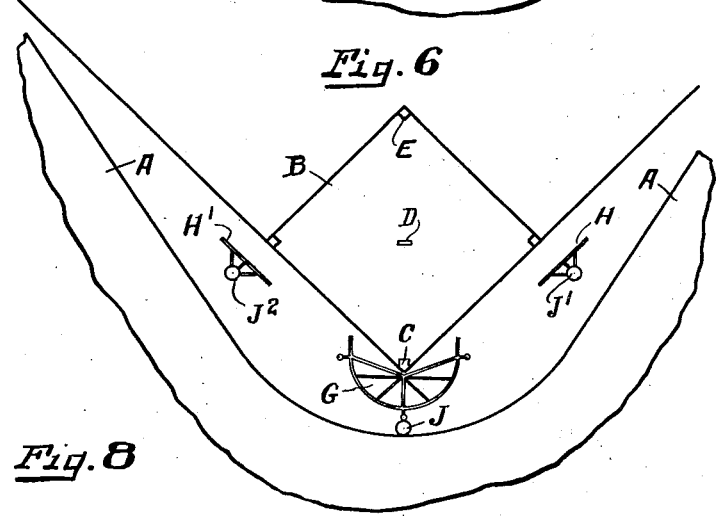
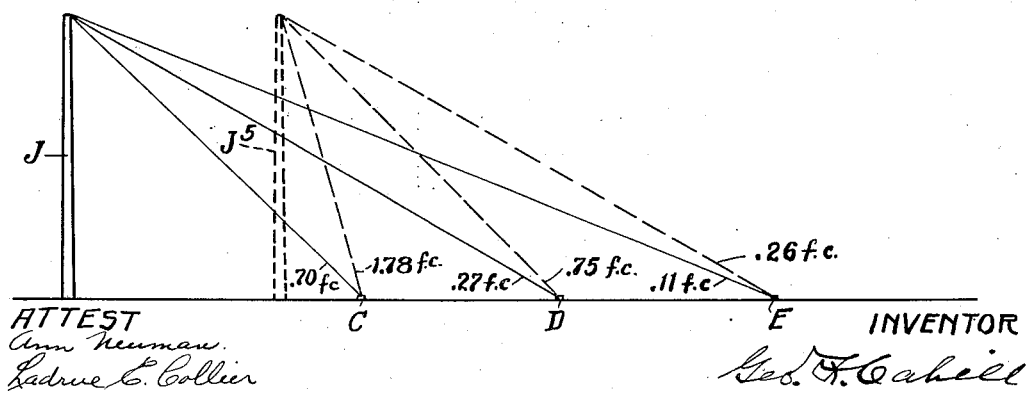
ATTEST INVENTOR

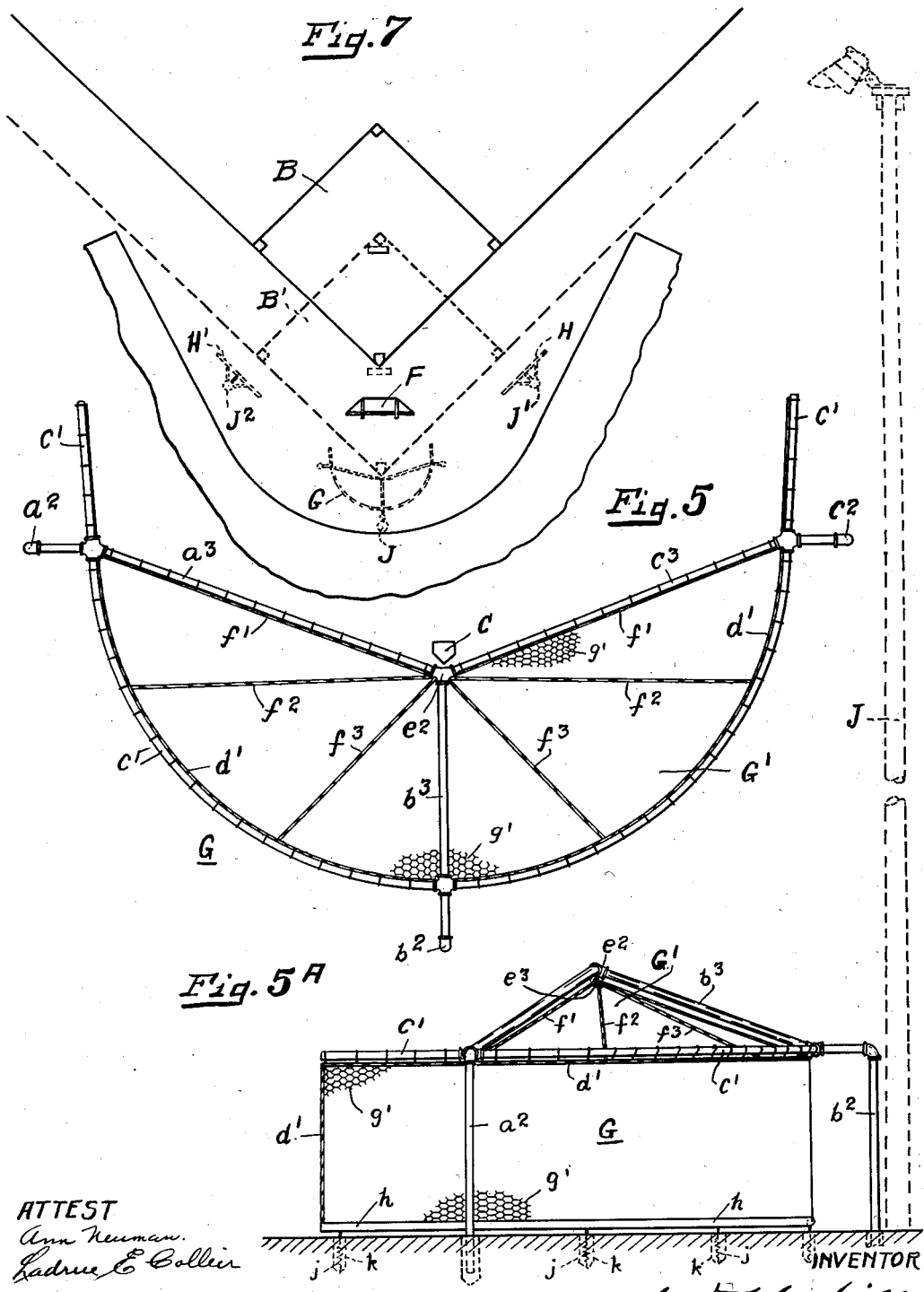

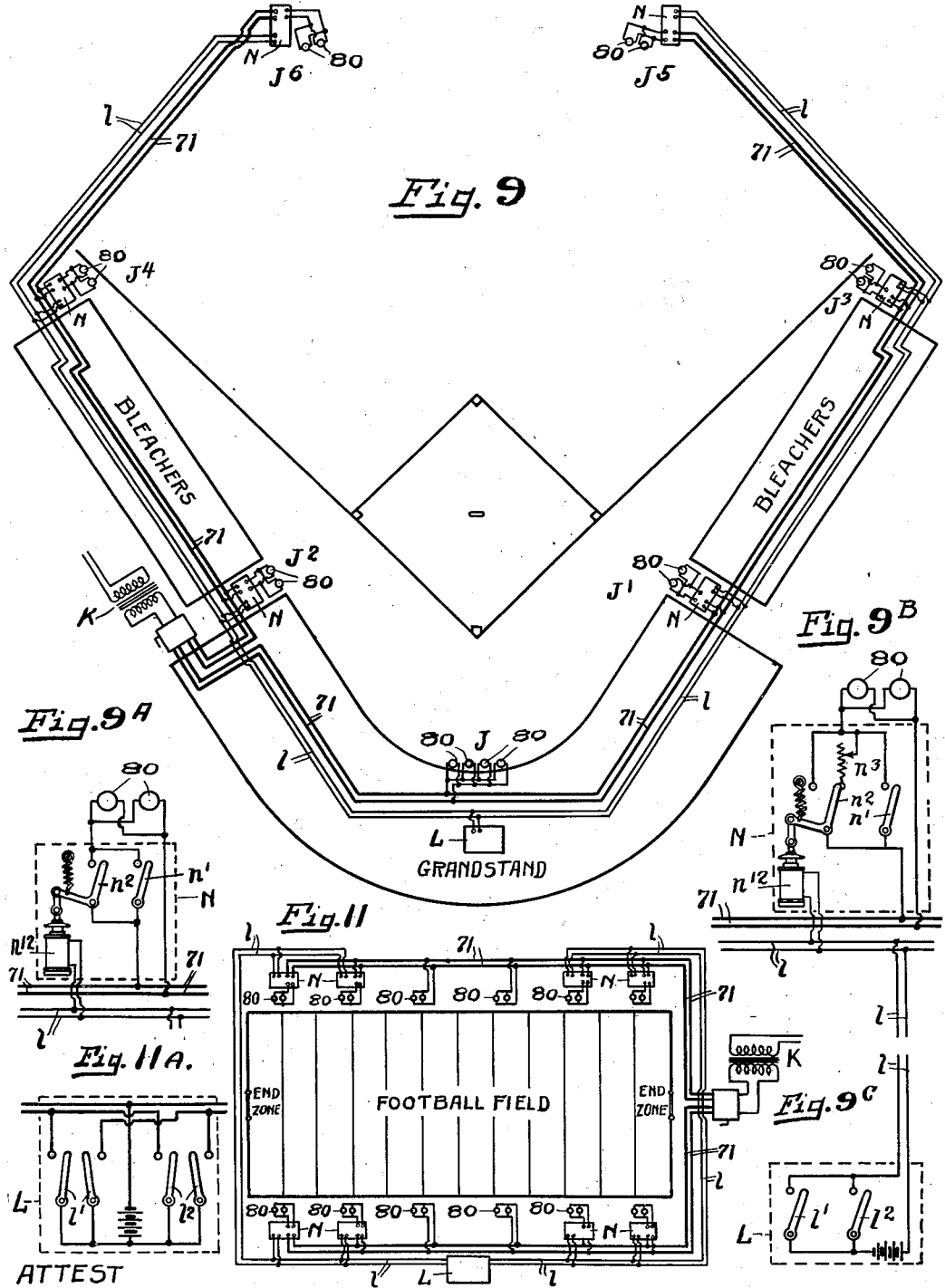

June 11, 1935.  G. F. CAHILL  2,004,888
SPORTS ARENA AND THE ACCESSORY THERETO
Filed Sept. 6, 1934  7 Sheets-Sheet 5

ATTEST
Ann Neuman
Ladrue E. Collier

INVENTOR
Geo. F. Cahill

June 11, 1935.   G. F. CAHILL   2,004,888
SPORTS ARENA AND THE ACCESSORY THERETO
Filed Sept. 6, 1934   7 Sheets-Sheet 6
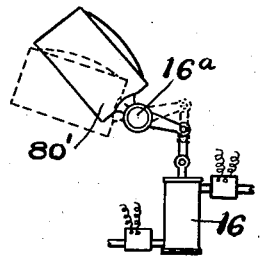
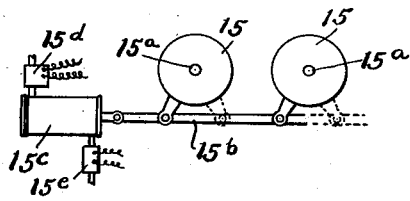
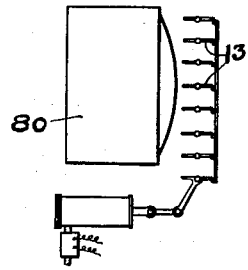
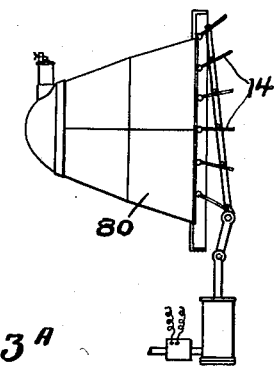
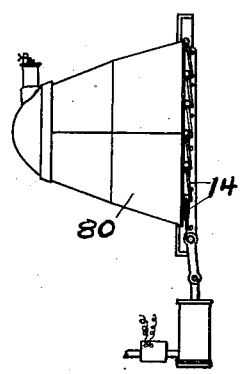
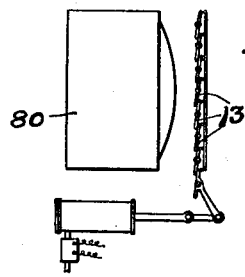
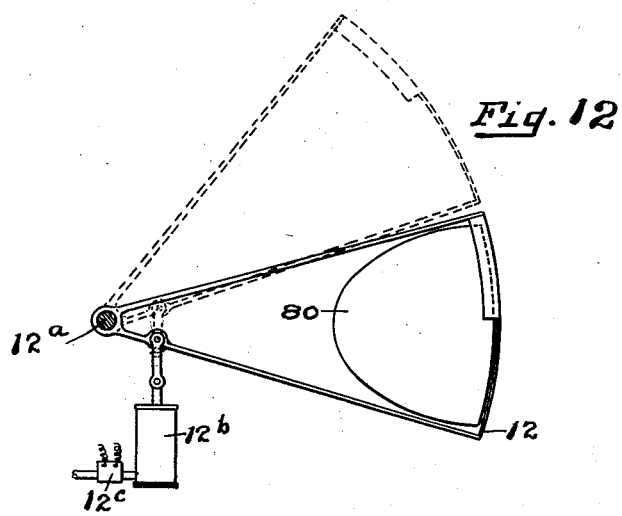
ATTEST
Ann Neuman
Ladrue E. Collier
INVENTOR
Geo. F. Cahill Patented June 11, 1935

2,004,888

UNITED STATES PATENT OFFICE 2,004,888

SPORTS ARENA AND THE ACCESSORIES THERETO

George F. Cahill, New York, N. Y.

Application September 6, 1934, Serial No. 742,908

31 Claims. (Cl. 240—3)

The principal object of my invention is to enable the spectators, and especially those who sit in the grandstands at base ball games played under natural light, and such spectators at base ball games, foot ball games, etcetera, played or conducted under artificial illuminations, to see the ball in its flight and the action of the players more clearly and satisfactorily than they do now, and so to make such games or contests more attractive to the spectators.

Another object of my invention is to reduce the first or installation cost of illuminations for such purposes.

Another object of my invention is to reduce the running or continuing costs, especially for the electrical current, for such illuminations.

Another object of my invention is to reduce the strain, resulting from said illuminations, upon the eyes of the spectators.

Another object of my invention is to remove or reduce the possibility of disputes, arising from claims that the illumination, or the manipulation thereof contemplated by my invention, had interfered with or prevented the proper doing of the things to be done upon the illuminated playing field.

Another object of my invention is to permit an unobstructed view of a large part of the playing area of a base ball field, from every seat in the grandstand, although such seat may be protected from foul balls or from wildly-thrown balls.

Another object of my invention is to protect the spectators in parts of base ball grandstands, now now so protected, from foul balls or balls wildly thrown to first base or third base.

Another object of my invention is to cause the nets or screens which protect the spectators at base ball games, to present the least interference practicable to the observation of the game, and, consequently, the least possible annoyance to the spectators.

Another object of my invention is to prevent base ball players from being injured by being struck by foul balls deflected from any part of the framework which supports such screens or nets.

Another object of my invention is to so construct or arrange a base ball plant that base ball may be played in it in the daytime under what is now considered the best layout, arrangement or conditions for a game under natural illumination, and that, either without change or with very slight and easily-effected changes, base ball may be played therein in the evening under what I consider much better conditions for a game played under artificial illumination, than if it were played on the same diamond and outfield as the day game was played upon, and under illuminations such as have heretofore been constructed and arranged.

Another object of my invention is to reduce the very considerable proportion of the time now almost universally required for the playing of a professional game of base ball, during which practically no action is taking place at all, and so to increase the interest in watching such a game.

Another object of my invention is to make it possible to build base ball plants, with a given seating capacity and size of diamond and fair playing field, on smaller plots of ground than is required where the diamond and playing field are placed at the present customary distance from the grandstand.

Other objects of my invention will appear from the drawings and as the description proceeds.

In the accompanying drawings—

Fig. 1 is a plan view of a base ball field and grandstand of the conventional type, with the conventional (although not universal) distance of ninety feet from the home plate to the grandstand, backward of the catcher; but with a novel form of protective screen F, which is described more in detail below;

Fig. 2 is an elevation, on a greatly enlarged scale, of the screen F shown in Fig. 1, viewed from the direction of the grandstand, back of the home plate;

Fig. 3 is an end elevation of said screen viewed from the first base end, that is, viewed from the right of Fig. 2;

Fig. 3A illustrates a socket set in the ground, into which the lower end of one or other of the uprights that support the screen F, may be set permanently or when it is desired to place the screen upon the field temporarily;

Figs. 3B and 3C illustrate means set in the ground for keeping taut the netting of the screen F;

Fig. 4 is a plan view of a base ball plant, in which the diamond is located close to the grandstand, and in which means are provided for protecting the spectators in the grandstand from foul balls and from wildly-thrown balls to home, first base and third base, all in accordance with my invention;

Fig. 5 is a plan view of one type of curved screen for the protection of the spectators, such as indicated at G in Fig. 4, but on a larger scale than the scale of Fig. 4, showing one embodiment of this part of my invention;

Fig. 5A is a side elevation, viewed from the direction of third base, of the type of screen shown in Fig. 5;

Figure 10:
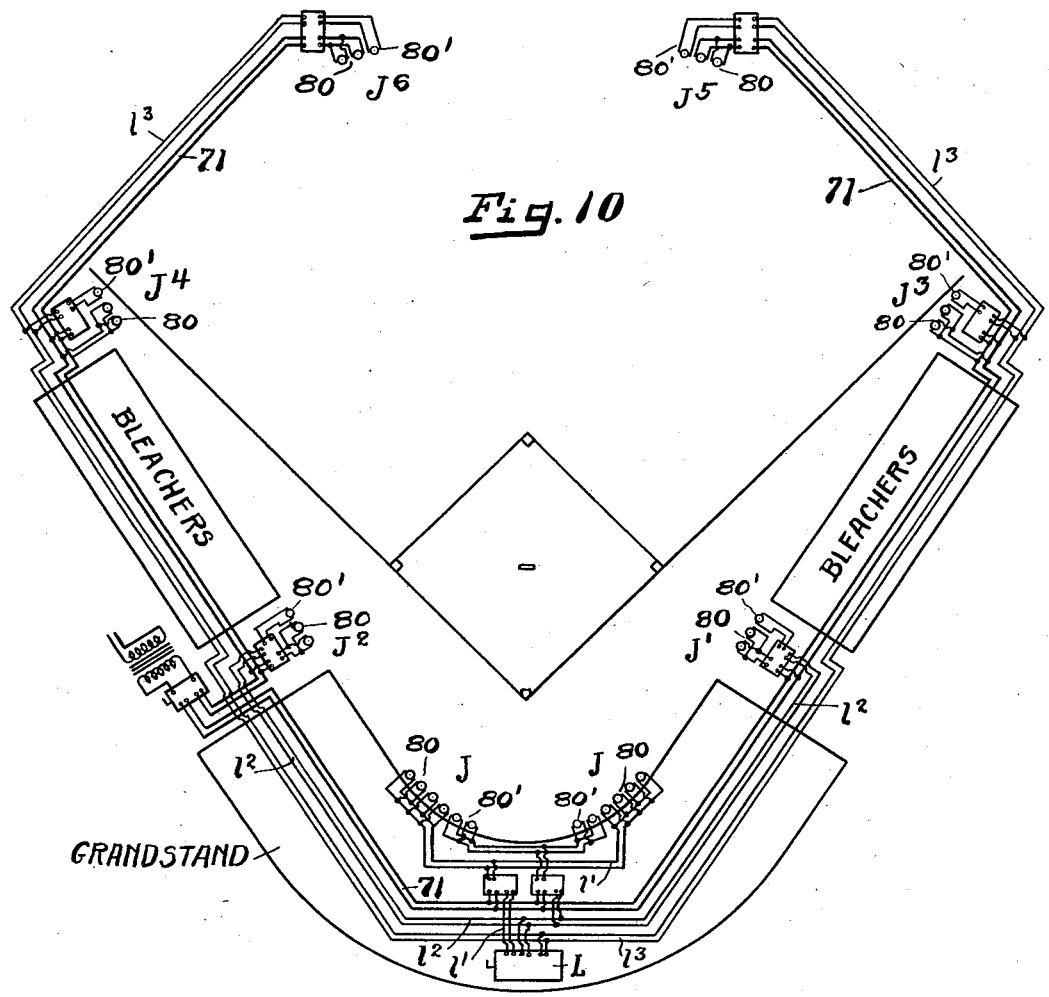
Figure 10A:
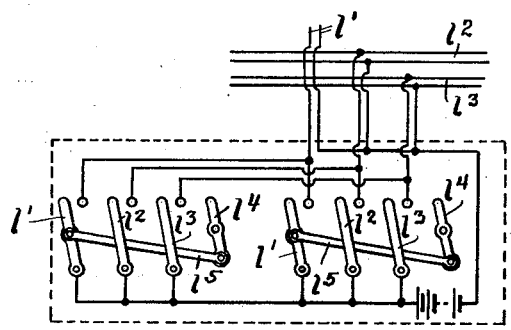

Fig. 6 is a plan view of a base ball plant, especially adapted for the playing of base ball at night, in which the diamond is located close to the grandstand, in which high light-supporting poles, J, J', J², are located upon the playing field, very close to the diamond, and in which means are provided for protecting the spectators in the grandstand from foul balls and from wildly-thrown balls to home, to first base and to third base, all in accordance with my invention;

Fig. 7 is a plan view of my improved combined layout for a base ball plant in which afternoon games may be played on a diamond at what is now considered the proper distance from the grandstand for daylight games, and with little or no change, night games can be played on a diamond closer to the grandstand and with the projectors for illuminating said field closer to the playing field;

Fig. 8 is a diagrammatic drawing to show the different intensities of light when reduced to the horizontal plane, falling on the home plate C, the pitcher's box D and second base B, from (in solid lines) the Cahill 2,000-watt duplex projector on a light-supporting pole J 90 feet back of the batter, and from (in dotted lines) a similar projector on a light-supporting pole of similar height 25 feet back of the batter, to illustrate how greatly the light at those points is increased by bringing the light-sources close up to the diamond instead of back against the front of a grandstand 90 feet away;

Fig. 9 is a diagrammatic plan view of a base ball field illuminated for night games, and so constructed and arranged (in order to reduce the consumption of current and the strain upon the eyes of the players and spectators) that certain projectors or groups of projectors may be dimmed or entirely turned off and again brightened or turned on, at will;

Figs. 9A, 9B and 9C are detail diagrammatic plan views, on a greatly enlarged scale, in comparison with the scale of Fig. 9, of duplex controlling mechanism for the turning off or dimming, and for the turning on or brightening, of one or more of the projectors or groups of projectors, shown in Fig. 9, for illuminating the field or the space over the field;

Fig. 10 is a diagrammatic plan view of another construction for illuminating a base ball field for games at night, in which the switching apparatus for turning on or brightening and for turning off or dimming one or other projector or groups of projectors for illuminating the field and the space over the field is somewhat more elaborate than is the apparatus shown in Fig. 9;

Fig. 10A is a detail diagrammatic plan view, on a much enlarged scale, of one form of duplex controlling apparatus, for controlling the projectors or groups of projectors shown in Fig. 10;

Fig. 11 is a diagrammatic plan view of a foot ball field so illuminated for night play, that certain projectors or groups of projectors may be dimmed or turned off, and again brightened or turned on, at will;

Fig. 11A is a detail diagrammatic plan view, on a greatly enlarged scale, of one form of duplex controlling apparatus for controlling the projectors of Fig. 11;

While the constructions of Figs. 9 to 11A show the turning on or brightening and the turning off or dimming of the projectors or groups of projectors as being done only by controlling the flow of electricity to the projectors, the constructions of Figs. 12 to 16 show mechanical means for accomplishing practically the same result, as far as the lighting of the field or parts of the field are concerned. In those Figures, 12 to 16, the mechanical action may be effected pneumatically by means of electrical control from one central point, or it may be effected by electrical means only from such central point. Of those figures—

Figure 17:
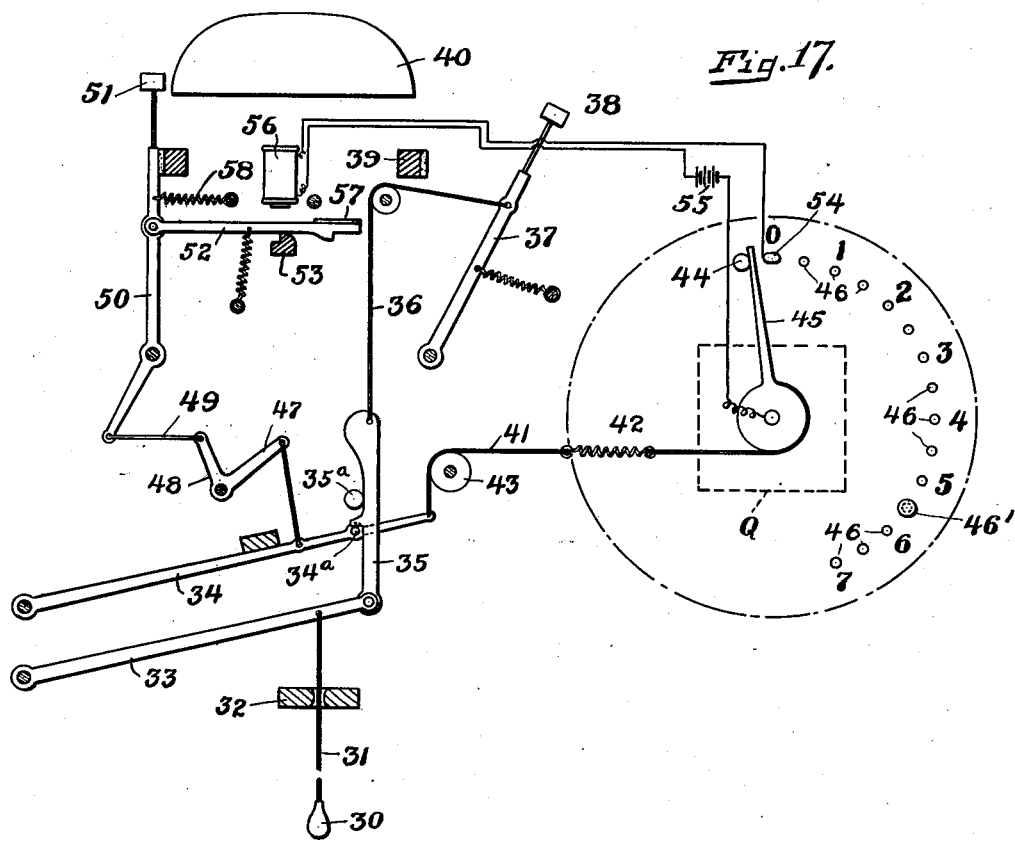

Fig. 12 is a side elevation of a movable screen which cuts off or permits the flow of the light from its projector, according to the position of the screen;

Figs. 13 and 13A show constructions in which much the same result is attained by the opening or closing of shutters or blinds;

Figs. 14 and 14A show a somewhat different construction of shutters or blinds;

Fig. 15 shows a plurality of turn tables, on which projectors are to be mounted, by means of which the light is permitted to flow on to the desired area or is turned aside therefrom;

Fig. 16 shows a construction by which the light of a projector intended especially to light the space above the field, is permitted to flow into that space, or by tilting the projector backward, is thrown high enough into the air so that none of its rays will fall into the eyes of the spectators or players who are to be protected therefrom;

Fig. 17 is a side elevation of one embodiment of that part of my invention which seeks to make contests, and especially contests played or staged for spectators, more interesting to the spectators by reducing the time during which none of the action, which the spectators came to see, is taking place and the interest is naturally waning, by determining and giving definite notice to players and spectators of the time at which the next, or a certain next, play or movement should take place.

Similar reference characters refer to similar parts in all the drawings.

In practically all high-class base ball grandstands, a screen or net is hung in front of the central part of the grandstand behind the catcher and batter, to protect spectators from fast-flying foul balls. This screen is often 75 feet to 100 feet wide, measured along the front of the grandstand. And a rather heavy and durable netting that materially obstructs the view is commonly used. That netting frequently obscures, more or less, the batter and catcher from something like two thousand seats. If that netting were not there, those seats would be considered the most desirable in the grandstand by many people. Yet at the great majority of ball games in the finest grandstands of the country, those seats are practically deserted, unless late-comers are forced into them reluctantly. Those seats are avoided just because of the netting in front of them, which materially interferes with the view and annoys or tires the eyes of many people who would like otherwise to sit in them. And from many of those seats the netting obscures more or less either the entire playing field, or at least the whole diamond and proximate parts of the field, where nine-tenths of the play takes place.

But I have found that the tiring or annoying effect which such netting produces upon the eyes and the mind, is very greatly reduced, if one does not have to look through it all the time or to see most of the playing field, but only temporarily, while watching the flight, or the latter part of the flight, of a pitched ball, for instance.

For the extensive, thick-wired netting, commonly used and which obstructs the view from many seats, I, therefore, substitute a small screen, using a much finer netting which obscures but a small part of the field, and which, preferably, is shaped and positioned about as indicated at F in Fig. 1. And I have found that, the less rigid such netting is made, that is, the more easily it can yield to the ball and the more slowly it can stop it, the finer and weaker the threads or wires required. If free to yield substantially under the impact of balls, fine, thin threads stop balls just as effectively as coarser and stronger wires or threads do, which stop the ball more quickly, whether by virtue of the mass of the netting itself or the unyielding nature of its attachment to fixed objects.

Enlarged views of one construction of my improved screen F, are shown in the side elevation, Fig. 2, and in the end elevation, Fig. 3. In those views, suitably-shaped bars or pipes, a and b, are set in the ground permanently, or into pipes or sockets, n, of Fig. 3A, set into the ground, from which pipes or sockets the pipes or bars, a and b, may be lifted when it is desired to remove the screen from the field. Carried in any suitable manner by the lower parts of the forward-and-upward-reaching arms; a', b', of the bars or pipes, a and b, is a substantially horizontal bar or tube, c. Below that bar or tube and attached to it in any suitable yielding manner, is a substantially horizontal rope or flexible member, d, lying below the netting and on the side toward the home plate. To the forward and upward ends of the upward-reaching bars, a', b', aforesaid, are attached the parts e', e', through eyelets in which passes another rope, f. To the lower end of the netting, g, is attached a heavy rope or rubber hose, h. Vertically, the netting itself, g, extends from the rope or hose, h, near the ground to the rope or flexible member, d, and thence to the horizontal or slanting parts of the rope, f, which extend from one end of the rope or rubber hose, h, to the end of the rope, d, thence diagonally to the eyelet, e', thence through the two eyelets, e', and e'; then diagonally to the other end of the rope, d, and thence to the left-hand end of the rope or rubber hose, h. And the ends of the net are attached to the rope, f, so that the net proper is bounded by the rope, f, and by the rubber hose, h, at its bottom. And I sometimes hold down the rope or rubber hose, h, by a number of links, i, i, connecting said rope, h, with expansible springs, j, j, whose lower ends are held in the tubes or casings k, k, driven into the playing field (see Figs. 3B and 3C). In the latter figure, the net, g, has been moved sidewise towards the right, as if by the body of a player coming into contact with it, until the contractile spring, j, has been stretched, somewhat as shown in the drawings, Fig. 3C. When desired, the straight-line screen or guard, F, may be formed to a curved or a semi-circular shape—more generally, to an arc-shape—something after the order of the back of the screen or guard, G, of Figs. 4, 5 and 5A.

The screen or guard, F, as I construct and position it, obscures only a small part of the playing field, instead of a very large part, and obscures the view of those parts much less than does the large screen now customarily used. And many of the spectators, who are protected from fast-flying foul balls by it, can see the pitcher without looking through any screen at all.

Further, the construction of my screen, where substantially every part of the net is free to move backwards easily under the impact of a ball, permits the use of netting formed from lighter and finer threads or wires than I have ever seen used in a screen at the front of a grandstand.

As a result, a screen or guard made in accordance with my invention, located a substantial distance from the grandstand and using fine wire or silk or linen thread or other suitable material for the netting, greatly relieves or almost wholly removes the annoyance or discomfort produced by the nets now generally used in front of grandstands. This improvement is produced partly by the greater distance I place the screen from the eye; partly by the smaller size of the threads or wires used; partly by the fact that the net, located much nearer to the home plate than in customary base ball layouts, is made narrower and so obscures but a small part of the playing field from any seat in the grandstand; and partly by the fact that for three-quarters or nine-tenths of the time, a spectator does not need to look through any screen at all.

This part of my invention, in brief, locates the screen or guard as near as practicable to the batter, from whom the foul balls radiate, instead of placing it as near as possible to the spectators to be protected, which permits the use of a relatively very small screen, that obstructs but a small part of the playing area, instead of a very large part of the playing area, and makes it necessary for the spectator in any one of the protected seats to look through the screen but a small part of the whole time instead of a great part of the whole time. And I make practically every part of the screen which can be struck by foul balls, of a character to stop the ball gradually, which permits much finer and thinner cords or wires to be used in the making of the screen than are now commonly used in the large, coarse, thick-wired and heavy screens at the front of the grandstand, which stop the ball much more suddenly, and must, therefore, be much stronger than my highly-resilient screen.

The rules under which base ball is practically universally played in the United States, provide that a base runner may take as many bases as he can on a passed ball, provided that the distance behind the catcher to the grandstand be 90 feet, but that if that distance be less than 90 feet, the base runner can take but one base on a passed ball. Largely on account of that rule and of the desire to protect the spectators from foul balls and from wildly-thrown balls to home, first base and third base, the nearest spectators directly behind the catcher and batter in many fine base ball plants, are more than 90 feet from the home plate, while the nearest spectators in the neighborhood of first base and third base, are something like 60 feet from those bases. Yet those spectators, if permitted to stand upon the field, would crowd out so close to the batter, catcher and base lines, that the players could scarcely play properly. The spectators would do this, because the game is more interesting when watched from the closest position possible than when watched from a greater distance.

In order to increase the interest of the spectators in the action of the game of base ball, I bring the playing field much closer to the grandstand than is now generally done, as is illustrated in Fig. 4. But when I bring the playing field and especially the batter, first base and third base, very close to the spectators, I provide special means to protect the spectators from fast-flying foul balls and from balls wildly thrown to home, first base or third base. By means of my protective devices, I bring the home plate within some 20 feet or 25 feet of the grandstand, and so greatly increase the impression made on the minds of the spectators.

But when I bring the home plate so close to the grandstand, I erect a screen (preferably, but not necessarily) of the general construction of the straight-line screen illustrated in Figs. 2 and 3, but formed preferably substantially as shown in Figs. 4, 5 and 5A, in which the wings of the screen, G, extend almost around to the base lines, but leaving sufficient room for the base runners to follow the base paths freely. The wings of the curved screen are brought so far around that they prevent as many foul balls as possible from passing into any part of the grandstand. More detailed illustrations of my preferred construction of curved screens and on a much larger scale, are shown in Figs. 5 and 5A.

And I provide other guards or screens, preferably straight-line guards or screens, such as H and H', to prevent wildly-thrown balls to first or third base from passing into the grandstand among the spectators. For this purpose, I use screens or guards, of any suitable kind, but preferably, of the character shown in Figs. 2 and 3, and before described.

The increasing interest of the general public in golfing and automobiling and the participation of the public directly in outdoor sports, has made it more difficult for base ball to draw crowds during daylight hours, and many attempts and the expenditure of many thousands of dollars to light base ball fields for night play, have attained but indifferent success. To light a base ball field at night more satisfactorily, more efficiently and more economically than has heretofore been done, I bring the diamond back as close to the grandstand as possible, as illustrated and just explained in connection with Fig. 4 for day games, and I raise a high light-supporting post or tower, J, J' or J², on the playing field, preferably directly back of each of the screens shown in Fig. 4. In Fig. 5A, such a high light-supporting post, J, is shown in dotted lines, back of the screen, G. Similar posts, J', J², are used back of the first base and third base screens. Preferably, I attach to and suspend from the posts, J' and J², the straight-line screens used at first base and third base, so as to reduce, as far as possible, all obstacles between the spectator and the playing field.

The general construction of the curved screen, G, of Figs. 4, etc., and especially Figs. 5 and 5A, is much like that of the straight-line screen, F, of Figs. 1, 2 and 3, except that it is formed to a curve instead of to a straight line. The upright pipes or bars $a^2$, $b^2$, $c^2$, are much like the upright pipes or bars, $a$ and $b$, of the straight-line screen illustrated in Figs. 2 and 3, and their upward-and-forward extending arms, $a^3$, $b^3$, $c^3$, are much like the forward-and-upward reaching arms, $a'$ and $b'$, in Figs. 2 and 3, except that the upward-and-forward extending arms, $a^3$, $b^3$ and $c^3$, converge toward a common point and meet in the triple connection, $e^2$, which stands preferably substantially straight above the home plate. From that junction-piece, $e^2$, depends a hook or eyelet, $e^3$, through which the ropes, $f'$, $f^2$ and $f^3$, pass. To the rope, $f'$, (partly obscured by the arms $a^3$ and $c^3$) the upper end of the screen or net, $g'$, is attached, while said netting passes over and is supported by the ropes, $f^2$, $f^3$ and $d'$. The ends of the ropes, $f'$, $f^2$ and $f^3$, are attached to the rope, $d'$, resiliently suspended from or attached to the horizontal circular bar or pipe, $c'$. The bottom of the net, $g'$, is attached to a rope or rubber hose, $h$, which may be spring-pulled toward the ground in as many places as desired, as indicated more fully in Figs. 3A, 3B and 3C, in connection with the straight-line net, $g$. The ends of the net are attached to the parts of the rope, $d'$, where it passes from proximity to the bar or tube, $c'$, down to the rope or rubber hose, $h$.

While the curved guard or screen, G, is shown in several of the figures of the drawings, with straightened ends, I sometimes construct said screen or guard in circular or elliptical shape. When I conform my guard or screen, G, to elliptical shape, I preferably construct it with the long line of the axis at right angles to the line from the second base to home plate.

In the calculations of light intensities in Fig. 8, it is assumed that a 2,000-watt Cahill duplex projector is mounted upon each of the parts, J and J⁵, and that such projector gives a light intensity at the mouth of the projector of 16,000 foot-candles over a spread wide enough to include the home plate, the pitcher's box and the second base. The average of the intensities of light on those three points from the projector 25 feet back of the home plate, and 90 feet above the ground, is 2.583 times that of the intensities of light given by the same projector at the same height ninety feet back of the home plate. Besides throwing far more light upon the diamond for a given number of projectors and consumption of current, the bringing of the light-sources so close to the fair playing field, has the effect of raising them relatively higher into the air and further above the eyes of the players and spectators. This is a matter of great importance where powerful lights have to be used around a field, over which the flight of a small rapidly-moving and far-traveling base ball is to be followed clearly by the players and spectators.

The bringing of the diamond much closer to the grandstand permits not only such bringing of the light-sources closer to the playing field, but also brings the action upon the playing field closer to the spectators, from which near position less light upon the ball is needed to see the ball with a given clearness than from a position materially further away.

The most important games of commercialized base ball are, of course, those of the major leagues and of the more important minor leagues, commonly referred to as organized base ball. Long-established rules and custom have determined that these games shall be played in the afternoon and in base ball plants where the diamond and fair playing field are substantially removed from the grandstand. In those leagues, especially of the higher classification, a club commonly plays on its home grounds for from ten days to three weeks, and then goes away and plays for a substantially equal number of days upon the grounds of its competitors. In the past, such base ball plants, although very expensive, have commonly been used during the regular playing season, for practically nothing but the afternoon game, and this for not over one-half the days of the playing season, or for not much more than two hours an afternoon of seventy-seven days a year. But, by my system, I make it practicable to use some of these ball-grounds, especially those on which the regular scheduled games are still played in the afternoon, for the playing of other games at night, especially during the periods when the home club is away.

By this part of my invention, I provide a base ball plant, with accessories thereto, which is primarily of the usual or standard type of base ball plant for the playing of base ball by daylight, but which is easily altered according to my invention, so as to adapt it more satisfactorily than heretofore to the playing of base ball at night. To this end, I lay down the diamond and playing field in its customary position, as shown in solid lines in Fig. 7 for day games, and provide a guard or screen, F, conformed and positioned, preferably, after the manner of that in Fig. 1, which guard or screen is easily erected upon the field and easily removed from the field. And I lay down, as illustrated in dotted lines in Fig. 7, a second diamond close to the grandstand for use during night games. By the construction illustrated in Fig. 7, day games, when the light is super-abundant, may be played with the diamond and playing field in the present customary relation to the grandstand, while night games may be played with the diamond and playing field drawn back very close to the grandstand while the spectators in the grandstand are protected from foul balls and wildly-thrown balls, substantially as they are in the construction of Fig. 6. The bars or pipes, $a$ and $b$, of my straight-line screens, or the bars or pipes, $a^2$, $b^2$, $c^2$, of my curved screens, may be set in the ground in concrete, or in any other suitable manner, when they are to be left permanently upon the field. In the embodiments of my invention, however, it becomes desirable to make my straight-line screens, and sometimes even my curved screens, removable. In such case, the lower part of the uprights, $a$, $b$, $a^2$, $b^2$, $c^2$, etc., may be set into and lifted out of sockets of any suitable construction, such, for example, as $n$, in Fig. 3A.

Although many attempts, and by the greatest electrical companies of the world, have been made in recent years to light base ball fields so that professional games may be played at night for spectators, the cost of electrical current and certain defects in the illuminations themselves are now threatening the continuance of night base ball.

The cost of current for an evening game in smaller towns, has often been so great that games have been played at night where the whole gate receipts did not equal the cost of the current; and, on some occasions, the admission price has been refunded to the spectators and they have been asked to permit the cancellation of the game, since the attendance was not sufficient to pay the bill for current alone.

On such illuminated base ball fields, the invariable custom, so far as applicant knows, has been to burn the entire illumination during the whole period from the beginning to the end of the game. That period will be sometimes hereinafter spoken of as the game. But I have perceived that there are considerable periods, during the game—aggregating generally more than half the whole time of the game—during which no action of any kind, except that the pitcher is holding the ball, is taking place upon any part of the playing field, if that may be called action. And I have perceived that during such periods, the spectators naturally direct their gaze toward the infield, particularly to the pitcher, batter and catcher, rather than toward the outfield.

Further, in the better and more expensive illuminations, some projectors are directed toward the lighting of the field and the lower space over the field, while other projectors are directed mainly—almost wholly—to the lighting of the higher space over the field where fly balls pass. And I have perceived that, during the whole period of the game, the upper space over the field for fly balls need be illuminated but a very inconsiderable part of the whole time, if only its illumination can be turned on when needed, and soon thereafter turned off.

Further, and of even more importance, the powerful lights that are necessary for the illumination of the field and of the lower space over the field, and to a lesser extent, the lights for the illumination of the high space over the field, have so interfered with the view of the spectators as either to rob the game of much of its interest, or to send the spectators home with burning eyes, or headaches. In most illuminations so far installed for the playing of base ball at night, spectators sitting in that part of the grandstand near first base, for instance, have looked pretty constantly in the direction of groups of powerful projectors in the neighborhood of third base, when watching the pitcher, the batter or the flight of the ball from the pitcher to the batter or catcher. And spectators on the third base side have similarly looked toward groups of powerful projectors on the first base side.

In probably the most famous base ball illumination yet made, which was installed by one of the greatest lighting companies of the world, applicant failed to find any seat in the grandstand where some brilliant projector did not shine into his eyes, and as time passed, annoy and oppress his eyes.

And applicant has perceived that the powerful projectors have a tendancy to attract his eye most and, therefore, to affect his eyes most objectionably, during the intervals when there is least action upon the field and when his gaze is freest to be attracted upward from the field toward them, and that he is most unconscious of such lights, and least annoyed by them, when he is watching the basemen, or any runners on the bases, or intently watching the pitcher while waiting for him to deliver the next ball. And he has found that the annoying or objectionable effect of the powerful projectors is cumulative, that is, that it increases the longer the projectors are exposed to his eye. Applicant has found, also, that the strain upon his eyes is caused especially by those projectors toward (although not necessarily at) which he looks while he is looking toward the pitcher and batter, and that the projectors backward, or directly back of, the catcher and batter, annoy his eyes, when sitting in the central part of the grandstand, distinctly less than do groups of projectors more directly in front of him.

By one embodiment of my invention (see especially Figs. 9 to 9C) I turn off or dim down one or more lights or groups of lights during the periods when no action or practically no action is taking place upon the field, and I brighten or turn on some or all of them when action is anticipated, as for instance, at the instant when the pitcher delivers the ball or prepares to deliver the ball, at which instant the eyes of the spectators are most completely turned away from the projectors and are least affected by the light from the projectors. But, during the period when some lights are dimmed or turned off, I leave on such lights as may be considered desirable, and especially the group or groups of lights backward from or directly back of, the batter and catcher, thus making the diamond or infield much the brightest part of the fair field, and naturally concentrating the gaze of the spectators upon it and preventing other powerful projectors (which are then turned off) from attracting the gaze of the spectators, while there is little or no action upon the field.

By this part of my invention, I reduce very greatly the total amount of current used during the evening; I relieve the eyes of the spectators of much of the strain upon them; I substitute a feeling of restful ease for one of annoyance, and I make the field, the players and the ball look brighter when the full lights are turned on again, since the eyes, while no action was taking place and part of the lights were turned off or dimmed, had naturally been opening themselves to see by a lesser or dimmer illumination.

And, to prevent complaints that the lights or some lights were turned off at the very time when they were needed, I so construct my controlling apparatus that it may be operated by two men, one representing one team and the other representing the other team, either of which men can turn the lights on without the assistance of the other, but both of whom must co-act before the lights can be turned off, if both have turned them on.

In the diagrammatic view of Fig. 9, projectors, 80, 80, (indicated by a circle), mounted upon suitable high posts (such, for instance, as that illustrated in Fig. 5A) or upon suitable high towers, in about the positions marked J, J', $J^2$, $J^3$, $J^4$, $J^5$ and $J^6$, are supplied with current from the transformer, K. And such projectors or such groups of projectors as may be desired, are turned off or dimmed or turned on or brightened from time to time by one man or by men representing the opposing teams, by means of any suitable distant-control apparatus, such as that, for instance, illustrated diagrammatically in Figs. 9A, 9B and 9C, which men and the control-apparatus of Fig. 9C, which they operate, may be located in the control house, L, or in other suitable location.

Between the main feed wires, 11, 11, in Fig. 9, and any projector or group of projectors which may be desired to be able to turn on and off, I insert, preferably, distant-control switches, $n'$, $n^2$, as illustrated diagrammatically in Fig. 9A, or $n'$, $n^2$, in Fig. 9B. By closing the switch $n'$ in the apparatus illustrated in Fig. 9A, the projectors of the particular group to which that apparatus applies, are put into permanent connection with the feed wires, so that they may not be turned on or off from the main control station, L. But if it be desired to control such projector or group of projectors from the main control station, the switch $n'$ is left open, and the distant-control switch, $n^2$, can then turn on and off such projector or projectors. Said distant-control switch, $n^2$, is operated by the magnet, $n^{12}$, connected to the distant-control station, L, by the wires, $l$, $l$.

But where the turning on or off suddenly of a substantial group of projectors would disturb other users of electric current on the line that feeds the ball park, or where it is desired to bring the projectors to full brillance very quickly, I sometimes dim or turn down the projector or projectors instead of turning them off completely. One type of apparatus for this purpose is shown diagrammatically in Fig. 9B, in which, as in Fig. 9A, the projector or projectors may be connected with the feed wires definitely by closing the switch, $n'$, while the distant-control switch, $n^2$, instead of turning the current off completely, connects the projector or projectors to the feed line through the resistance, $n^3$.

In the special type of distant-control apparatus illustrated in Fig. 9C, for operating the distant-control switches of Figs. 9A and 9B, one switch, $l'$, may be operated by a representative of one team and a parallel switch, $l^2$, operated by a representative of the other team. By this construction, the representative of either team may light all projectors so controlled, by simply closing his switch, while such projectors can be turned off only by the opening of both switches, if both switches, $l'$ and $l^2$, have been closed. The circuit controlled by the switches, $l'$ and $l^2$, runs, of course, to the control boxes, N, N, N, that control the turning on and turning off of the projector or projectors at different points upon the field.

The group or groups of projectors backward from, or directly back of, the catcher and batter, I preferably leave burning all the time.

While one distant-control circuit, as $l$ in Fig. 9, may control all groups of projectors except those backward from the batter, I sometimes use a plurality of such distant-control circuits, and energizing devices therefor, each to control its own group or groups of projectors, whether said group or groups of projectors light primarily the field, as before described, or the space over the field, as before described. Thus, I sometimes dissociate the groups of projectors near first base and third base from the groups of projectors that light the outfield especially.

In the diagrammatic view of Fig. 10 is shown a more elaborate embodiment of my invention than that disclosed in Fig. 9. In the construction of Fig. 9, but one group of projectors, at the position, J, directly back of the catcher and batter, is indicated to light particularly the part of the field occupied by the catcher, batter, pitcher, etc.; while in Fig. 10, two groups of projectors, 80, 80, not so directly back of the catcher and batter, are indicated. Such groups of projectors may, of course, be placed in any suitable position. Also, in conjunction with each of those groups, as also in conjunction with the other groups, J', $J^2$, $J^3$, $J^4$, $J^5$ and $J^6$, other projectors, 80', 80', 80', are indicated to light primarily the higher space over the field where batted balls pass. The projectors, 80', 80', 80', to light the higher space over the field, I generally locate lower down toward the ground or the top of the grandstand, while the projectors, 80, 80, 80, to light primarily the field and the lower space over the field, I place as high upon the tower or pole as practicable.

Further, in Fig. 10, certain groups of projectors, as for instance, the projectors in the positions J' and $J^2$, may be turned on and off independently of other projectors, as for instance, the groups of projectors at positions $J^3$ and $J^4$. And the groups of projectors back of the outfield, in the positions $J^5$ and $J^6$, may be turned on and turned off independently of the group or groups of projectors in other positions, as may also some of the groups of projectors for lighting the higher space over the field, which may be turned on and off independently of the projectors for lighting the field and the lower space over the field.

Fig. 10A illustrates diagrammatically a duplex or two-man control apparatus for energizing the distant-control switches on three different circuits. And the whole is so constructed that a movement of one hand from left to right easily closes, in rapid or slow succession, one circuit after another, while a further movement actuating the part, $l^4$, through the link, $l^5$, serves to open the circuit, $l'$, without disturbing either of the other circuits.

Since the powerful projectors used for lighting foot ball fields are very commonly placed between the stands on either side of the field and the gridiron proper, and since such projectors are generally directed straight into the eyes of the spectators on the other side of the field, and since the play in foot ball moves lengthwise of the field, but never simultaneously occupies all parts of the field, Fig. 11 shows diagramatically a construction by which I apply my invention to the lighting of foot ball fields, and turn off projectors that may annoy the eyes of spectators when their light is not needed, while lighting, by other projectors, the part or parts of the field where the play is taking place at the moment, and save current, also.

By the construction of Fig. 11, I preferably leave the two central projectors or groups of projectors on either side of the field lighted practically constantly, while I turn off the two projectors or groups of projectors on either side of the field which light one or the other end of the field. If the play is occurring at the right-hand end of the gridiron, shown in Fig. 11, I preferably leave lighted the two central projectors and the two projectors on either side of the field, at the right-hand end of the field, while turning off the two projectors or groups of projectors on either side of the field at the left-hand end of the field. If the play moves down the field beyond the center of the field, I preferably light the two groups of projectors on either side at the left-hand end of the field, and then turn off the two groups of projectors on either side at the right-hand end of the field.

By such manipulating of the illumination of a foot ball field, I attain at least three desirable results: 1st, the lights further down the field which are most in the eyes of the players when looking horizontally or nearly horizontally down the field, are turned completely off or dimmed down very greatly; 2d, during a very considerable part of the time between the beginning and the end of the game, either a third or two-thirds of all the projectors which light the field and throw their beams directly into the eyes of the spectators, may be turned off without any diminution of the illumination during the actual playing of the game; and 3d, I materially reduce the bill for electrical current.

Fig. 11A illustrates one construction of distant-control apparatus for the turning on and off the distant-control switches by one man or by two men representing the two contesting teams. Either man, by closing, or moving to the left, the left-hand switch of his pair of switches, $l'$ or $l^2$, can light the projectors at the left-hand end of the field, and by closing, or moving to the right, the right-hand switch of his pair of switches, $l'$ or $l^2$, can light the projectors at the right-hand end of the field, while, if both men have closed the proper switch, the lights can be turned off only by the joint action of the two men.

In the constructions so far described, the turning on or turning off, the brightening or the dimming, of the projectors or groups of projectors, has been done by controlling the flow of electricity to the filaments in the projectors. But I sometimes accomplish practically the same result by mechanical means, preferably pneumatically operated and pneumatically or electrically controlled from a central point, as for instance, the control station, L, in Figs. 9 or 10, although the projectors remain lighted constantly.

In Figs. 12 to 16, constructions are shown which permit or obstruct the flow of the light to the desired area in one or other of four different ways: 1st, as in the side elevation, Fig. 12, by interposing an opaque screen or shield, 12, in front of the projector, 80, or withdrawing it therefrom; 2d, as in Figs. 13 to 14A, by permitting or obstructing the flow of light by opening or closing shutters; 3d, as in Fig. 15, by turning somewhat upon a vertical axis the projectors so that their beams of light flow to the intended area or are turned aside therefrom; or 4th, as in the construction of Fig. 16, by turning a projector or projectors, preferably those for lighting the higher space above the field, on a horizontal axis, so that their beams of light flow into the desired area over the field or are turned upward so as not to flow into that area or to pass into the eyes of spectators and players.

In the construction of Fig. 12, a side elevation, an opaque screen or shield, 12, centered at $12^a$, may be lifted from in front of its projector, 80, by the pneumatic device $12^b$, controlled by the distant-control valve, $12^c$, or may be allowed to drop by gravity, or in any other suitable manner, down in front of said projector.

In Figs. 13 and 14, the shutters are open to permit the passage of light from the projectors, 80, 80; while in Figs. 13A and 14A, the shutters, 13 and 14, are closed to prevent the passage of the light.

In the construction of Fig. 15, two turn tables, 15, 15, set upon vertical axes, $15^a$, $15^a$, on which may be mounted projectors, 80, 80 (not shown) are operated, through the link, $15^b$, by the pneumatic device, $15^c$, which pneumatic device, in turn, is controlled by the distant-control valves, $15^d$ and $15^e$. By such a construction, projectors to light brightly a certain part of the field, throw their light upon that part of the field when in one position, and turn the beam away from that part of the field and out of the eyes of players and spectators, when in another position.

Similarly, the beam from the projector, 80', shown in Fig. 16, may be directed into the space it is intended to light, or turned upward, so as not to light that space or to pass into the eyes of spectators and players.

The construction of Fig. 17 illustrates, somewhat diagrammatically, a signalling device, which gives two signals, the first when started, impelled or manually operated, and the second automatically a predetermined length of time thereafter, as a means of determining and notifying players (more particularly, the pitcher) and spectators when the next action or the next action of a certain kind, (as for instance, the next pitching of the ball) should take place. In that figure—

30 is a knob at the end of the cord or pull-piece 31, which passes through a hole in the block or stop 32, and is attached to the lever 33.

The lever 33, when depressed, pulls down the lever, 34, by means of a link, 35, pivoted to the end of the lever, 33. When the lever, 33, pulls down the link, 35, it also, through the cord, 36, pulls to the left the lever, 37, which carries the spring-supported bell-striking tongue, 38, into contact with the stop or rest, 39, and so causes the tongue, 38, to strike the bell, 40, and said bell to ring. The pulling down of the cord, 31, and the depressing of the lever, 34, pulls, through the cord, 41, and the spring, 42, which cord passes over the wheel or knob, 43, the arm or clock hand, 45, of the clock-mechanism, Q, from its position of rest against the stop, 44, down to and against the movable stop, 46', set in one or other of the holes, 46, 46, in the face or dial of the clock-mechanism, Q.

The spring of the clock-mechanism, Q, is partly wound by the pulling down of the arm 45 and starts said arm backwards towards its position of rest against the stop, 44, as soon as it is permitted to do so by the releasing of the tension upon the cord, 41, and spring, 42. That tension is released and the lever, 34, returned to the position it occupies in the drawings, when the pin, 34ª, in it is released from contact with the latch or protuberance on the link, 35, which release is effected by the downward movement of the link, 35, in contact with the stop, 35ª, as illustrated in the drawings.

The lever, 34, when depressed by the pulling down of the cord, 31, pulls down also, the arm, 47, of the bell-crank lever, 48, the vertical arm of which, through the cord, 49, pulls to the right the lower end of the lever, 50, which also carries a spring-supported bell-striking tongue, 51, on its upper end. When the upper end of the lever, 50, is moved toward the left, it pulls with it the spring-depressed horizontal link, 52, until the notch or catch in that link, 52, is drawn over the stop, 53, and engages therewith, holding the lever, 50, and bell-striking tongue, 51, away from the bell, 40. When, however, the clock-arm or hand, 45, in its return to its position of rest against the stop, 44, passes over the electrical contact, 54, which, through the battery, 55, energizes the magnet, 56, which acts upon the armature, 57, and lifts the end of the lever, 52, until its pawl or catch is released from contact with the stop, 53. The contractile spring, 58, then pulls back the lever, 50, and causes its bell-striking tongue, 51, to strike the bell, 40, so giving automatically, and after a predetermined and adjustable length of time, the second signal. The whole mechanism may be enclosed in any suitable case (not shown), in which case the dial of the clock-mechanism would not be exposed to view. But I prefer to so construct the apparatus that the clock-mechanism and dial will be exposed to the view, at least of the players interested, while the other parts of the mechanism are enclosed in any suitable case.

While in the drawings I have shown a dial with only seven seconds or full time units marked upon it, any desirable number may, of course, be used. And while I have shown whole seconds and half seconds, any other divisions of time may, of course, be used.

When, in this specification, and especially in the statement of claim at the end hereof, I speak of a projector or projectors, without other limitations, I mean that term to include any light-source suitable for the purpose, whether any of its rays, a small part of its rays, or a very large part of its rays are deflected or concentrated by surrounding light-reflecting surfaces, or by lenses, since light-sources and light-reflecting or light-concentrating devices of various kinds are well known in the art, and any one that is suitable for the purpose may be used, in practicing my invention.

When, in this specification or in the statement of claim at the end hereof, I use the word "extinguish" or "extinguishing" in relation to a light or lights or a beam of light or beams of light, I mean either to cause the light to cease to burn, in the ordinary sense of the word extinguish, or in any way to cause its light or the beam or beams of light to cease to flow to the area or objects ordinarily illuminated by it, whether by turning the source of light away from it, or by screening or otherwise shutting off the beam from such source of light.

When in this specification or in the statement of claim at the end hereof, I use the words "part of a field", "part of the field", "another part of the field", or other similar words, I use those words to mean either the field itself on which the players move, or the space above the field through which the ball moves, the proper lighting of both of which is necessary to the playing of practically every game in which a ball is used aerially; and the lighting of which, especially for the game of base ball, is best accomplished by different groups of projectors, each group primarily lighting, or greatly increasing the illumination upon or throughout, the particular part of the field or space over the field which it lights especially, although it contributes also, in a lesser degree, to the illumination of the field and space over the field as a whole.

When, in this specification or in the statement of claim at the end hereof, I use the words "when no action is taking place upon the field" or other similar words, I mean no competitive action, such as pitching, batting or fielding of the ball or running of the bases, although the pitcher may have the ball preparatory to delivering it to the batter, or the ball may be traveling from the catcher back to the pitcher, preparatory to its return to the batter again.

When, in this specification or in the statement of claim at the end hereof, I speak of "a game", of "games", or "for the playing of the game" or "for the playing of games", or use other similar words or expressions, I mean them to include, of course, not only actual set contests or games, but also practice games or practice in preparation for the playing of games, whether such practice includes all parts of the game or games, or only certain parts or elements, which may be repeated over and over again to obtain proficiency therein, and whether the plant or arena in which such practice takes place is a complete plant or arena on which championship contests might take place, or only a practice or fractional plant or arena on which only preliminary or partial practice, and not championship contests, can take place.

This application is a continuation in part of application Serial Number 706,903, filed January 17, 1934.

What I claim as my invention and desire to secure by Letters Patent is—

1. A plant for the playing of the game of base ball, which includes (a) a playing field; (b) the usual bases, pitcher's box, home plate and foul lines upon said playing field; (c) a grandstand for spectators, devoid of the customary wide netting back of the batter for the protection of spectators in the central part of the grandstand from foul balls; and (d) a guard or netting located on the playing field, back of and near to the batter, completely surrounded by playing territory, and much narrower than the netting that has customarily been located at the front of the grandstand usually has been; said small guard or netting by reason of its proximity to the batter, stopping foul balls which could be stopped only by a much wider screen at the front of the grandstand, while obstructing the view, from seats in the central part of the grandstand, of a smaller part of the playing field than does the wide screen that has customarily been used at the front of the grandstand.

2. A plant for the playing of the game of base ball, which includes (a) a playing field; (b) the usual bases, pitchers box, home plate and foul lines upon said playing field; (c) a grandstand for spectators, devoid of the customary wide netting back of the batter for the protection of spectators in the central part of the grandstand from foul balls; and (d) a guard or netting located on the playing field, back of and near to the batter, completely surrounded by playing territory, and much narrower than the netting that has customarily been located at the front of the grandstand usually has been; said small guard or netting by reason of its proximity to the batter, stopping foul balls which could be stopped only by a much wider screen at the front of the grandstand, while obstructing the view, from seats in the central part of the grandstand, of a smaller part of the playing field than does the wide screen that has customarily been used at the front of the grandstand; practically all parts of said small guard or netting which can be struck by foul balls being constructed of a yielding or resilient construction.

3. A plant for the playing of the game of base ball, which includes (a) a playing field; (b) the usual bases, pitcher's box, home plate and foul lines upon said playing field; (c) a grandstand for spectators, devoid of the customary wide netting back of the batter for the protection of spectators in the central part of the grandstand from foul balls; and (d) a guard or netting located on the playing field, back of and near to the batter, completely surrounded by playing territory; said guard or netting extending so far around said batter as to approach the first-base line and the third-base line.

4. A plant for the playing of the game of base ball, which includes (a) a grandstand for spectators, devoid of the customary wide netting back of the batter for the protection of spectators in the central part of the grandstand from foul balls; (b) a playing field; (c) the usual bases, pitcher's box, home plate and foul lines upon said playing field, but all located or marked out much closer to the grandstand than is now customary in professional base ball; and (d) a guard or netting located upon the playing field between the grandstand and the batter, and extending so far around the batter as to approach the first-base line and the third-base line.

5. A plant for the playing of the game of base ball, which includes (a) a grandstand for spectators, devoid of the customary wide netting back of the batter for the protection of spectators in the central part of the grandstand from foul balls; (b) a playing field; (c) the usual bases, pitcher's box, home plate and foul lines upon said playing field, but all located or marked out much closer to the grandstand than is now customary in professional base ball; (d) a guard or netting located upon the playing field between the grandstand and the batter, and extending so far around the batter as to approach the first-base line and the third-base line; and (e) guards or nettings to protect spectators in the grandstand from balls thrown toward first-base or toward third-base.

6. A plant for the playing of the game of base ball at night, which includes (a) a playing field; (b) the usual bases, pitcher's box, home plate and foul lines upon said playing field; (c) a grandstand for spectators, devoid of the customary wide netting back of the batter for the protection of spectators in the central part of the grandstand from foul balls; (d) a guard or netting located on the playing field, back of and near to the batter, completely surrounded by playing territory, and much narrower than the netting that has customarily been located at the front of the grandstand usually has been; said small guard or netting by reason of its proximity to the batter, stopping foul balls which could be stopped only by a much wider screen at the front of the grandstand, while obstructing the view, from seats in the central part of the grandstand, of a smaller part of the playing field than does the wide screen that has customarily been used at the front of the grandstand; (e) a projector-supporting means integral with, or erected on playing territory just back of, the guard or netting specified in (d) above; and (f) flood-light projectors upon such projector-supporting means, for the lighting of parts of said base ball field at night.

7. A plant for the playing of the game of base ball at night, which includes (a) a grandstand for spectators, devoid of the customary wide netting back of the batter for the protection of spectators in the central part of the grandstand from foul balls; (b) a playing field; (c) the usual bases, pitcher's box, home plate and foul lines upon said playing field, but all located or marked out much closer to the grandstand than is now customary in professional base ball; (d) a guard or netting located upon the playng field between the grandstand and the batter, and extending so far around the battery as to approach the first-base line and the third-base line; (e) a projector-supporting means integral with, or erected on playing territory just back of, the guard or netting specified in (d) above; and (f) flood-light projectors upon such projector-supporting means, for the lighting of parts of said base ball field at night.

8. A plant for the playing of the game of base ball at night, which includes (a) a grandstand for spectators, devoid of the customary wide netting back of the batter for the protection of spectators in the central part of the grandstand from foul balls; (b) a playing field; (c) the usual bases, pitcher's box, home plate and foul lines upon said playing field, but all located or marked out much closer to the grandstand than is now customary in professional base ball ; (d) a guard or netting located upon the playing field between the grandstand and the batter, and extending so far around the batter as to approach the first-base line and third-base line; (e) guards or nettings to protect spectators in the grandstand from balls thrown toward first-base or toward third-base; (f) projector-supporting means integral with, or erected on playing territory just back of, the guards or nettings specified in (d) and (e) above; and (g) flood-light projectors upon each of such projector-supporting means, for the lighting of parts of said base ball field at night.

9. A base ball plant for use interchangeably in daylight and under artificial illumination, which includes (a) a grandstand for spectators;

(b) a playing field; (c) the usual bases, pitcher's box, home plate and foul lines upon said playing field for the playing of the game of base ball in daylight, and at about the present customary distances from the grandstand for daylight games; (d) supplemental bases, pitcher's box, home plate and foul lines, upon said playing field, but located much closer to the grandstand than the ones mentioned in (c) above; (e) a removable guard or netting located on the playing field back of and near to the batter, completely surrounded by playing territory and much narrower than the netting that has customarily been located at the front of the grandstand usually has been; (f) a supplemental guard or netting back of the supplemental home plate above mentioned, and extending so far around said batter as to approach the supplemental first base line and the supplemental third base line; (g) removable guards or nettings to protect spectators in the grandstand from balls thrown toward the supplemental first base or the supplemental third base aforesaid; and (h) lights for lighting the playing field when base ball is to be played at night.

10. A base ball plant for use interchangeably in daylight and under artificial illumination, which includes (a) a grandstand for spectators, devoid of the customary wide netting back of the batter for the protection of spectators in the central part of the grandstand from foul balls; (b) a playing field; (c) the usual bases, pitcher's box, home plate and foul lines upon said playing field for the playing of the game of base ball in daylight, and at about the present customary distances from the grandstand for daylight games; (d) supplemental bases, pitcher's box, home plate and foul lines, upon said playing field, but located much closer to the grandstand than the ones mentioned in (c) above; (e) a removable guard or netting located on the playing field back of and near to the batter, completely surrounded by playing territory and much narrower than the netting that has customarily been located at the front of the grandstand usually has been; (f) a supplemental guard or netting back of the supplemental home plate above mentioned, and extending so far around said batter as to approach the supplemental first base line and the supplemental third base line; (g) removable guards or nettings to protect spectators in the grandstand from balls thrown toward the supplemental first base or the supplemental third base aforesaid; and (h) lights for lighting the playing field when base ball is to be played at night.

11. A base ball plant for use interchangeably in daylight and under artificial illumination, which includes (a) a grandstand for spectators; (b) a playing field; (c) the usual bases, pitcher's box, home plate and foul lines upon said playing field for the playing of the game of base ball in daylight, and at about the present customary distances from the grandstand for daylight games; (d) supplemental bases, pitcher's box, home plate and foul lines, upon said playing field, but located much closer to the grandstand than the ones mentioned in (c) above; (e) a removable guard or netting located in the playing field back of and near to the batter, completely surrounded by playing territory and much narrower than the netting that has customarily been located at the front of the grandstand usually has been; (f) a supplemental guard or netting back of the supplemental home plate above mentioned, and extending so far around said batter as to approach the supplemental first base line and the supplemental third base line; (g) removable guards or nettings to protect spectators in the grandstand from balls thrown toward the supplemental first base aforesaid; and (h) lights for lighting the playing field when base ball is to be played at night.

12. A base ball plant for use interchangeably in daylight and under artificial illumination, which includes (a) a grandstand for spectators; (b) a playing field; (c) the usual bases, pitcher's box, home plate and foul lines upon said playing field for the playing of the game of base ball in daylight, and at about the present customary distances from the grandstand for daylight games; (d) supplemental bases, pitcher's box, home plate and foul lines, upon said playing field, but located much closer to the grandstand than the ones mentioned in (c) above; (e) a removable guard or netting located on the playing field back of and near to the batter, completely surrounded by playing territory and much narrower than the netting that has customarily been located at the front of the grandstand usually has been; (f) a supplemental guard or netting back of the supplemental home plate above mentioned, and extending so far around said batter as to approach the supplemental first base line and the supplemental third base line; (g) guards or nettings to protect spectators in the grandstand from balls thrown toward the supplemental first base aforesaid; and (h) lights for lighting the playing field when base ball is to be played at night.

13. A plant and accessories thereto for the playing of the game of base ball, which includes (a) a grandstand for spectators; (b) a playing field; (c) the usual bases, pitcher's box, home plate and foul lines upon said playing field; and (d) a timing signal, constructed and adapted to indicate visually the passage of time, and to automatically give an audible signal a predetermined, adjustable length of time after it has been started, and so located as to be easily visible to the pitcher while facing in the general direction of the batter.

14. A plant and accessories thereto for the playing of the game of base ball, which includes (a) a grandstand for spectators; (b) a playing field; (c) the usual bases, pitcher's box, home plate and foul lines upon said playing field; and (d) a timing signal, constructed and adapted to give an audible signal when started, to indicate visually the passage of time, and to automatically give an audible signal a predetermined, adjustable length of time after it has been started, and so located as to be easily visible to the pitcher while facing in the general direction of the batter.

15. The method of manipulating the illumination of a field for the playing of games of ball at night, repeatedly during the progress of the game, which consists in (a) lighting brightly that part of the field on which action involving the ball is taking place or is about to take place, and lighting another part of the field less brightly when no action involving the ball is taking place upon said less brightly-lighted part of the field; (b) lighting more brightly said less brightly-lighted part of the field when the ball has moved thereto, or may be about to move thereto, from the brightly-lighted part of the field aforesaid; and (c) lighting again less brightly said formerly less brightly-lighted part of the field when action involving the ball has ceased to take place thereon.

16. The method set forth in claim 15 with the further limitation, the lighting brightly and the lighting less brightly being effected, repeatedly during the progress of a game, by a person or persons in a position to watch the playing of the game.

17. The method of manipulating the illumination of a field for the playing of games of ball at night, repeatedly during the progress of the game, which consists in (a) lighting brightly that part of the field on which action involving the ball is taking place or is about to take place, and lighting another part of the field less brightly when no action involving the ball is taking place upon said less brightly-lighted part of the field; (b) lighting more brightly, by the action of a representative of either contesting team, said less brightly-lighted part of the field when the ball has moved thereto, or may be about to move thereto, from said brightly-lighted part of the field aforesaid; and (c) lighting again less brightly, by the action of the representatives of both contesting teams, said formerly less brightly-lighted part of the field when action involving the ball has ceased to take place thereon.

18. The method set forth in claim 17, with the further limitation, the lighting brightly and the lighting less brightly, repeatedly during the progress of a game, being done by the representatives of the contesting teams from a position from which they are able to watch the playing of the game.

19. Apparatus for illuminating fields for the playing of games of ball at night, which includes (a) means for lighting brightly that part of the field on which action involving the ball is taking place or may be about to take place, and another part of the field less brightly when no action involving the ball is taking place upon said less brightly-lighted part of the field; (b) means for lighting more brightly, by the action of a representative of either contesting team, said less brightly-lighted part of the field when the ball has moved thereto, or may be about to move thereto, from said brightly-lighted part of the field aforesaid; and (c) means for again lighting less brightly, by the action of the representatives of both contesting teams, said formerly less brightly-lighted part of the field when action involving the ball has ceased to take place thereon; the whole being so adapted that the illumination of the normally less brightly-lighted part of the field may be repeatedly raised during the course of the game as action involving the ball takes place thereon or may be about to take place thereon, and reduced when action involving the ball has ceased to take place thereon.

20. The method of manipulating the illumination of a field for the playing of the game of foot ball at night, repeatedly during the progress of the game, which consists in (a) lighting brightly one end of the field and the central part of the field when action involving the ball is taking place or is about to take place on that end of the field or on the central part of the field, and lighting less brightly the other end of the field on which no action involving the ball is taking place; (b) lighting more brightly, said less brightly-lighted end of the field when action involving the ball is on or is about to move onto the less brightly-lighted end of the field from said brightly-lighted part or parts of the field aforesaid; and (c) lighting less brightly the end of the field which was formerly more brightly-lighted, when action involving the ball has ceased to take place upon said more brightly-lighted end of the field.

21. The method of manipulating the illumination of a field for the playing of the game of foot ball at night, repeatedly during the progress of the game, which consists in (a) lighting brightly one end of the field and the central part of the field when action involving the ball is taking place or is about to take place on that end of the field or on the central part of the field, and lighting less brightly the other end of the field on which no action involving the ball is taking place; (b) lighting more brightly, by the action of a representative of either contesting team, said less brightly-lighted end of the field when action involving the ball is on or is about to move onto the less brightly-lighted end of the field from said brightly-lighted part or parts of the field aforesaid; and (c) lighting less brightly, by the action of the representatives of both contesting teams, the end of the field which was formerly more brightly lighted, when action involving the ball has ceased to take place upon said more brightly-lighted end of the field.

22. Apparatus for illuminating foot ball games at night, which includes (a) means for lighting the central part of the gridiron brightly when action involving the ball is taking place thereon or may be about to take place thereon, and the ends of the gridiron less brightly; (b) means for lighting, by the action of a representative of either contesting team, one end of the gridiron more brightly when action involving the ball is taking place thereon or may be about to take place thereon; (c) means for lighting, by the action of a representative of either contesting team, the other end of the gridiron more brightly when action involving the ball is taking place thereon or may be about to take place thereon; (d) means for reducing, by the action of the representatives of both contesting teams the illumination upon the end of the field first mentioned when action involving the ball has ceased to take place thereon; and (e) means for reducing, by the action of the representatives of both contesting teams, the illumination upon the end of the field second mentioned, when action involving the ball has ceased to take place thereon; the whole being adapted to be so manipulated, repeatedly during the progress of the game, as the action involving the ball moves from part to part of the field lengthwise.

23. The method of manipulating the illumination of a field for the playing of base ball at night, repeatedly during the progress of the game, which consists in (a) lighting that part of the field occupied by the pitcher, batter and catcher brightly, and another part of the field less brightly, when no action involving the ball is taking place upon the field; (b) lighting more brightly said less brightly lighted part of the field when action involving the ball is taking place thereon or may be about to take place thereon; and (c) lighting again less brightly said less brightly-lighted part of the field, when action involving the ball has ceased to take place thereon.

24. The method of manipulating the illumination of a field for the playing of base ball at night, repeatedly during the progress of the game, which consists in (a) lighting that part of the field occupied by the pitcher, batter and catcher brightly, and another part of the field less brightly, when no action involving the ball is taking place upon the field; (b) lighting more brightly said less brightly lighted part of the field when action involving the ball is taking place thereon or may be about to take place thereon; and (c) lighting again less brightly said less brightly-lighted part of the field, when action involving the ball has ceased to take place thereon; the lighting brightly and the lighting less brightly, being effected, repeatedly during the progress of a game, from a position from which the playing of the game may be watched.

25. The method of manipulating the illumination of a field for the playing of base ball at night, repeatedly during the progress of the game, which consists in (a) lighting that part of the field occupied by the pitcher, batter and catcher brightly, and another part of the field less brightly, when no action involving the ball is taking place upon the field; (b) lighting more brightly, by the action of a representative of either contesting team, said less brightly-lighted part of the field when action involving the ball is taking place thereon or may be about to take place thereon; and (c) lighting again less brightly, by the action of the representatives of both contesting teams, said less brightly-lighted part of the field, when action involving the ball has ceased to take place thereon.

26. Apparatus for illuminating base ball games at night, which includes (a) means for lighting that part of the field which is occupied by the pitcher, batter and catcher brightly and another part of the field less brightly, when no action involving the ball is taking place upon the field; (b) means for lighting more brightly, by the action of a representative of either contesting team, said less brightly-lighted part of the field when the ball has moved thereto or may be about to move thereto, from said brightly-lighted part of the field aforesaid; (c) means for reducing, by the action of the representatives of both contesting teams, the illumination upon said formerly less brightly-lighted part of the field when action involving the ball has ceased to take place thereon; and (d) controlling apparatus by which the lighting brightly and the lighting less brightly are effected, repeatedly during the progress of the game, so positioned and adapted that it may be operated by a person or persons in a convenient position to watch the playing of the game.

27. The method of manipulating the illumination of a field for the playing of games of ball at night, repeatedly during the progress of the game, which consists in (a) lighting brightly the playing field or the part thereof on which action involving the ball is taking place or is about to take place, and lighting the space over the field less brightly; (b) lighting more brightly the higher space above the playing field or parts thereof when high balls are passing therethrough or may be about to pass therethrough; and (c) lighting again less brightly said higher space above the field or parts thereof when high balls have ceased to pass therethrough.

28. The method of manipulating the illumination of a field for the playing of games of ball at night, repeatedly during the progress of the game, which consists in (a) lighting brightly the playing field or the part thereof on which action involving the ball is taking place or is about to take place; and lighting the space over the field less brightly; (b) lighting more brightly, by the action of a representative of either contesting team, the higher space above the playing field or parts thereof when high balls are passing therethrough or may be about to pass therethrough; and (c) lighting again less brightly, by the action of the representatives of both contesting teams, said higher space above the field or parts thereof when high balls have ceased to pass therethrough.

29. The method of manipulating the illumination of a field for the playing of base ball at night, repeatedly during the progress of the game, which consists in (a) lighting brightly the playing field or the part thereof on which action involving the ball is taking place or is about to take place, and lighting the space over the field less brightly; (b) lighting more brightly the higher space above the playing field or parts thereof when high batted balls are passing therethrough or may be about to pass therethrough; and (c) lighting again less brightly said higher space above the field or parts thereof when high batted balls have ceased to pass therethrough.

30. The method of manipulating the illumination of a field for the playing of base ball at night, repeatedly during the progress of the game, which consists in (a) lighting brightly the playing field or the part thereof on which action involving the ball is taking place or is about to take place, and lighting the space over the field less brightly; (b) lighting more brightly, by the action of a representative of either contesting team, the higher space above the playing field or parts thereof when high batted balls are passing therethrough or may be about to pass therethrough; and (c) lighting again less brightly, by the action of the representatives of both contesting teams, said higher space above the field or parts thereof when high batted balls have ceased to pass therethrough.

31. Apparatus for illuminating base ball fields at night, which includes (a) projectors for lighting the playing field or parts thereof; (b) projectors for lighting the space above the playing field or parts thereof, through which high batted balls pass; (c) circuit-controlling mechanism, adapted to be operated by one man, for turning on and off at will, projectors which light space above the field where high batted balls pass, repeatedly during the progress of a game, when high batted balls are passing therethrough or may be about to pass therethrough; and (d) other circuit-controlling mechanism, adapted to be operated by another man, for turning on and off at will, repeatedly during the progress of the game, projectors for lighting the same space above the playing field or parts thereof, specified in (c) above; the circuit-controlling mechanisms specified in (c) and (d) preceding being constructed, arranged and operated in such a manner that the projectors mentioned in (c) above can be turned on by the men mentioned in either (c) or (d) above, but can be turned off only by the joint action of the two men mentioned in (c) and (d) above.

GEO. F. CAHILL.